(12) United States Patent
Tsukigase et al.

(10) Patent No.: US 10,906,112 B2
(45) Date of Patent: Feb. 2, 2021

(54) METHOD FOR IMPROVING FATIGUE STRENGTH

(71) Applicant: MITSUBISHI AIRCRAFT CORPORATION, Aichi (JP)

(72) Inventors: Kaoru Tsukigase, Aichi (JP); Tsuyoshi Saotome, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 897 days.

(21) Appl. No.: 15/423,049

(22) Filed: Feb. 2, 2017

(65) Prior Publication Data

US 2017/0239744 A1    Aug. 24, 2017

(30) Foreign Application Priority Data

Feb. 22, 2016  (JP) .................................. 2016-030965

(51) Int. Cl.

| B23K 9/00 | (2006.01) |
|---|---|
| C21D 1/09 | (2006.01) |
| C22F 1/00 | (2006.01) |
| C23C 26/00 | (2006.01) |
| B23K 9/235 | (2006.01) |

(52) U.S. Cl.
CPC .......... *B23K 9/0052* (2013.01); *B23K 9/0043* (2013.01); *B23K 9/235* (2013.01); *C21D 1/09* (2013.01); *C22F 1/00* (2013.01); *C23C 26/00* (2013.01)

(58) Field of Classification Search
CPC .... B23K 9/0052; B23K 9/0043; B23K 9/235; B23K 9/20; B23K 9/32; B23K 9/04; B23K 9/042; B23K 9/044; B23K 31/003; B23K 11/246; B23K 11/04; B23K 37/04; B23K 37/0408; B23K 37/0435; B23K 37/0443; C21D 1/09; C22F 1/00; C23C 26/00
USPC ........... 219/61, 69, 11, 69.16, 76.13, 97–100
See application file for complete search history.

(56) References Cited

U.S. PATENT DOCUMENTS

| 3,268,705 A | 8/1966 | Inoue |
|---|---|---|
| 3,277,267 A | 10/1966 | Blaszkowski |
| 3,459,917 A | 8/1969 | Roberts |

(Continued)

FOREIGN PATENT DOCUMENTS

| JP | S43-18268 | 3/1965 |
|---|---|---|
| JP | S58154451 A | 9/1983 |

(Continued)

OTHER PUBLICATIONS

Wikipedia page to "Flash Welding" (Year: 2020).*

(Continued)

*Primary Examiner* — Tu B Hoang
*Assistant Examiner* — Bonita Khlok
(74) *Attorney, Agent, or Firm* — Pearne & Gordon LLP (57) ABSTRACT

Provided is a novel method for improving fatigue strength, which is applicable to any small portion that is covered with another member. A method for improving fatigue strength according to the present invention includes: disposing an aid (3, 15) to be opposed to an processing object (2A, 2B, 6) on which a fatigue strength improving process is performed, the aid being configured to assist the improving process; and generating sparks between the aid (3, 15) and the processing object (2A, 2B, 6).

15 Claims, 7 Drawing Sheets

(56) References Cited

U.S. PATENT DOCUMENTS

| | | | | |
|---|---|---|---|---|
| 4,765,532 A * | 8/1988 | Uomoti | ................. | B23K 26/26 |
| | | | | 228/212 |
| 5,780,804 A * | 7/1998 | White | ................. | B23K 9/0061 |
| | | | | 219/121.43 |
| 6,515,249 B1 * | 2/2003 | Valley | ................. | B23K 20/129 |
| | | | | 219/55 |
| 6,555,779 B1 * | 4/2003 | Obana | ................ | B23K 26/1476 |
| | | | | 219/121.63 |
| 9,012,029 B2 * | 4/2015 | Lang | ........................ | F16B 5/10 |
| | | | | 428/594 |
| 9,085,042 B2 * | 7/2015 | Bruck | .................... | B23K 9/201 |
| 2002/0029597 A1 | 3/2002 | Choe et al. | | |
| 2010/0147818 A1 * | 6/2010 | Fondriest | ................. | B23K 9/00 |
| | | | | 219/137 |
| 2012/0171517 A1 * | 7/2012 | Yuschak | .............. | B23K 1/0012 |
| | | | | 428/674 |
| 2014/0044984 A1 * | 2/2014 | Bruck | .................... | B23P 6/005 |
| | | | | 428/601 |

FOREIGN PATENT DOCUMENTS

| | | |
|---|---|---|
| JP | 2002-039328 A | 2/2002 |
| JP | 2008038222 A | 2/2008 |

OTHER PUBLICATIONS

Alstom page to "Splice Plate" (Year: 2020).*
Japanese Patent Application No. 2016-030965 Office action and translation thereof dated Nov. 19, 2019.
Extended European Search Report dated Jun. 22, 2017.

* cited by examiner

| | BREAKING LOAD [kN] |
|---|---|
| COMPARATIVE EXAMPLE | 56.4 |
| EXAMPLE 1 | 56.1 |
| EXAMPLE 2 | 58.3 |
| EXAMPLE 3 | 55.6 |
| EXAMPLES (AVERAGE) | 56.7 |

METHOD FOR IMPROVING FATIGUE STRENGTH

BACKGROUND OF THE INVENTION

Field of the Invention

The present invention relates to a method for improving fatigue strength of a metallic member.

Description of the Related Art

A metallic member that repeatedly receives a stress is required to have fatigue strength, as well as static strength such as tensile strength and compressive strength. Accordingly, attempts have been made to improve the fatigue strength by various means.

As a typical method for improving the fatigue strength, a method is known in which a compressive residual stress is applied to a surface of a portion at which the fatigue strength is to be improved. For example, Japanese Patent Laid-Open No. 2002-39328 A discloses a method for improving the fatigue strength of a gear by applying a compressive residual stress to the surface of the gear by utilizing shot peening. Further, Japanese Patent Laid-Open No. 2008-38222 A proposes a technique in which an ultrasonic impact treatment is performed on a metallic member to apply a compressive residual stress thereto, and the portion subjected to the ultrasonic impact treatment is cooled at a predetermined rate while the ultrasonic impact treatment is performed, and/or immediately after the ultrasonic impact treatment.

The method for improving fatigue strength by applying the compressive residual stress can be applied regardless of the metallic material forming the metallic member to be processed, and can be applied not only before the use of the metallic member, but also after the use of the metallic member. Therefore, it can be said that the method is convenient.

However, in shot peening, which is a typical method of applying a compressive residual stress, it is necessary to project a projection material. Accordingly, this method is based on the premise that a portion at which the fatigue strength is to be improved is exposed. Therefore, when the portion at which the fatigue strength is to be improved is covered with another material, shot peening can be applied only after the member is dismounted.

For example, in the case of a fastener joint that penetrates through a plurality of fastened members and is fastened by a fastener, a circumferential surface that is an inner peripheral surface of each through-hole formed in the fastened members through which the fastener penetrates is an important target surface to which a residual stress is applied so as to improve the fatigue strength. However, even if the fastener is dismounted, or even after formation of each through-hole by cutting and before fastening of the fastener, it is difficult to project the projection material onto such a small portion.

In view of the above-mentioned circumstances, an object of the present invention is to provide a novel method for improving fatigue strength, which is applicable to any small portion that is covered with another member.

SUMMARY OF THE INVENTION

A method for improving fatigue strength according to an aspect of the present invention includes: disposing an aid to be opposed to a processing object on which a fatigue strength improving process is performed, the aid being configured to assist the improving process; and generating sparks between the processing object and the aid.

In the method for improving fatigue strength according to the present invention, it is only necessary to generate sparks between the processing object and the aid, and thus the method is applicable to any small portion that is covered with another member.

In the method for improving fatigue strength according to the present invention, welding due to the generation of the sparks is caused on an opposed surface of the processing object, the opposed surface being opposed to the aid, thereby making it possible to repair a crack generated on the opposed surface.

In the processing object subjected to a cutting process, a small crack that cannot be visually confirmed is generated on the cutting processing surface during cutting. This small crack may cause a fatigue fracture. Therefore, the crack is repaired by causing welding due to the generation of the sparks, which results in an improvement in the fatigue strength of the processing object.

In the method for improving fatigue strength according to the present invention, it is preferable that the opposed surface be formed of a circumferential surface facing one of a groove and a through-hole formed in the processing object.

The method for improving fatigue strength according to the present invention can be applied to any portion. However, since a concentration of stress is likely to occur at the groove or through-hole and the groove or through-hole is covered with another member in many cases, the groove or through-hole is suitably used as an object to which the present invention is applied.

In the method for improving fatigue strength according to the present invention, the aid may be attached to the processing object before the improving process for generating sparks is performed, or the aid may be opposed to the processing object when the improving process for generating sparks is performed. In the former case, the aid may form a part of the processing object. For example, the aid corresponds to the fastener of the fastener joint described above.

That is, in the method for improving fatigue strength according to the present invention, the processing object constitutes a first splice plate and a second splice plate that are fastened together; the aid constitutes a fastener that fastens the first splice plate and the second splice plate; and the processing object and the aid constitute a fastener joint. In this case, sparks can be generated between the fastener and one or both of the first splice plate and the second splice plate.

In the method for improving fatigue strength according to the present invention, it is only necessary to generate sparks between the processing object and the aid, and thus the method is applicable to any small portion that is covered with another member.

DETAILED DESCRIPTION OF THE PREFERRED EMBODIMENTS

A method for improving fatigue strength according to the present invention will be described below based on embodiments with reference to the accompanying drawings.

Figure 1A:
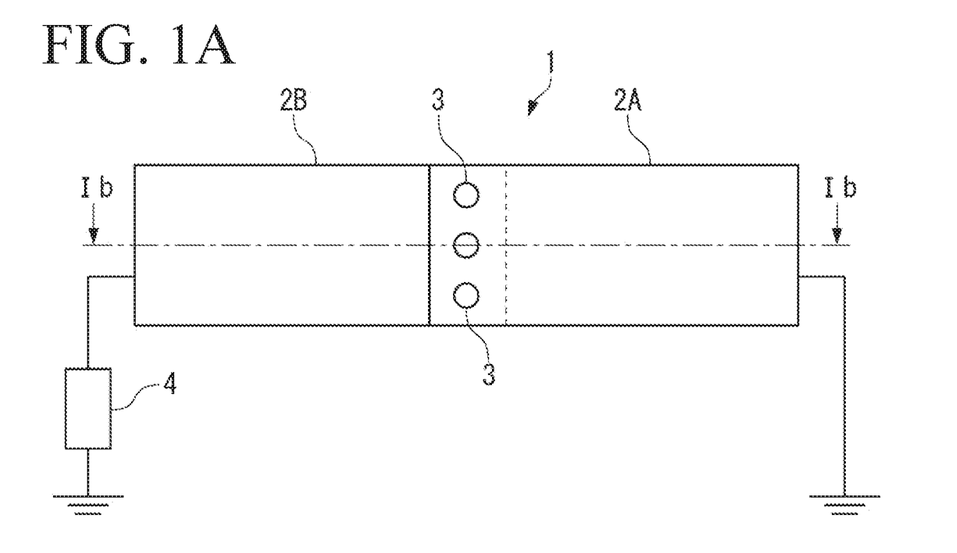
FIG. 1A is a plan view showing a sample on which a method for improving fatigue strength according to the present invention is carrier out.
Figure 1B:
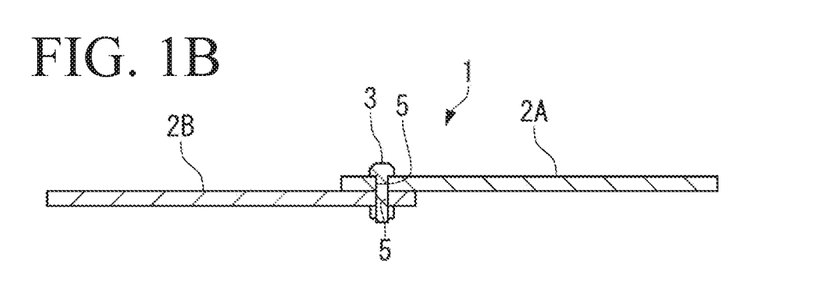
FIG. 1B is a sectional view taken along a line Ib-Ib shown in FIG. 1A.
Figure 1C:
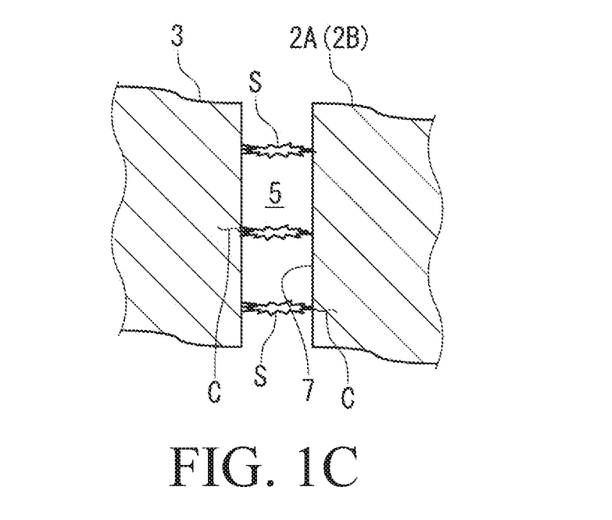
FIG. 1C is a partially enlarged view of FIG. 1B.

A method for improving fatigue strength according to this embodiment is applied to a fastener joint 1 having a structure in which a pair of a first splice plate 2A and a second splice plate 2B is connected by a plurality of fasteners 3, which are aligned, as shown in FIGS. 1A to 1C. In the method for improving fatigue strength according to this embodiment, a high current is applied to a node between the first splice plate 2A and the second splice plate 2B, thereby improving the fatigue strength of each of the first splice plate 2A and the second splice plate 2B.

The first splice plate 2A and the second splice plate 2B that constitute the fastener joint 1 are made of iron and iron-base alloys, aluminum and aluminum alloys, and other metallic materials. The first splice plate 2A and the second splice plate 2B each include a plurality of fastening holes 5 through which fasteners 3 made of a metallic material penetrate and inserted. The fasteners 3 are fastened in such a manner that the fasteners are inserted into the fastening holes 5, respectively, in the state where the positions of the fastening holes 5 in the first splice plate 2A match the positions of the fastening holes 5 in the second splice plate 2B, respectively.

When the fastener joint 1 is actually used as a structural element, a circumferential surface 7 which surrounds the fastening holes 5 in the first splice plate 2A and the second splice plate 2B repeatedly receives a stress through the fasteners 3, and a concentration of stress occurs on the circumferential surface 7. In addition, since the fastening holes 5 are formed by cutting, a small crack that cannot be visually confirmed is generated on the cutting processing surface during cutting and the crack remains on the circumferential surface 7. This small crack may cause a fatigue fracture.

In this embodiment, this small crack C is repaired and eliminated by welding, or the degree of the crack is reduced. In this embodiment, in order to weld a base material, a high-energy current is applied to a node between the first splice plate 2A and the second splice plate 2B by using a power supply 4 as shown in FIG. 1A. With this structure, as shown in FIG. 1C, sparks S are generated between each fastener 3 and the first and second splice plates 2A and 2B. Arc heat generated due to the sparks melts the surface of the circumferential surface 7, and the melted components flow into the small crack C and are then solidified, so that the small crack C is filled with the components. A series of operations described above is herein referred to as welding. The sparks S are more likely to be generated on a discontinuous surface. For this reason, the sparks are preferentially generated on a portion where the small crack C is formed, rather than on a continuous surface of the circumferential surface 7 on which the small crack C is not formed.

Therefore, the repair of the small crack C by generating the sparks S is convenient for this embodiment.

Next, the results of tests for demonstrating the method for improving fatigue strength according to this embodiment by application of a high current will be described.

Experiments were conducted in such a manner that the fastener joint 1 shown in FIG. 1 was prepared and a high current was applied, and then a fatigue strength test was conducted by repeatedly applying a tensile load and the behavior of fracture stress was measured. The applied current was 210 C (Coulomb) at maximum. An example in which the high current was applied is referred to as an Example. For comparison, a fatigue strength test was conducted in a similar manner to that of the Example, except that a high current was not applied. This example is referred to as Comparative Example. Note that the same material was used for the fastener joint 1 according to Example and the fastener joint 1 according to Comparative Example, and the fastener joints were prepared under the same processing conditions.

Further, a tensile strength test of applying a static load was conducted on the fastener joint 1 according to Example and the fastener joint 1 according to Comparative Example.

Figure 2A:
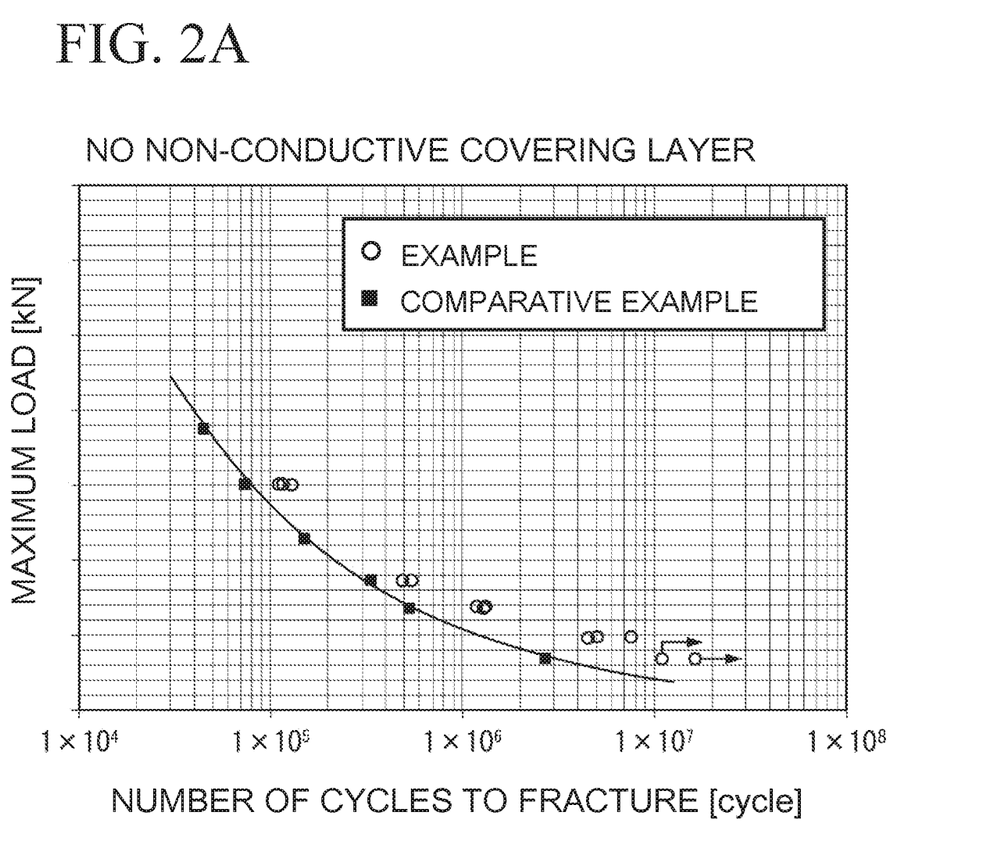
FIGS. 2A and 2B are graphs each showing results of tests for demonstrating the method for improving fatigue strength according to the present invention.

FIG. 2A shows the results of the fatigue strength test. FIG. 3 shows the results of the strength test of applying a static load. Note that in FIGS. 2A and 2B, the horizontal axis represents the number (cycle) of loads that are repeatedly applied until a rapture occurs, and the vertical axis represents a maximum load.

As shown in FIG. 2A, it was confirmed that the fatigue strength of the fastener joint 1 according to Example in which a high current was applied was improved as compared with the fastener joint 1 according to Comparative Example in which a high current was not applied. In particular, as the applied load (maximum load) decreases, the effect of improvement in the fatigue strength becomes larger, and the number of cycles to fracture is more than ten times higher than that in Comparative Example. On the other hand, as a result of measuring a breaking load as a static load (n=3) as shown in FIG. 3, there is no significant difference between Example and Comparative Example.

As described above, it was confirmed that the application of a high current enables an improvement in the fatigue strength without any adverse effect on the static strength.

Advantageous effects obtained by improving the fatigue strength according to this embodiment will be described.

In general, an improvement in the fatigue strength cannot be expected only by increasing the dimensions. For example, in the case of the fastener joint 1, when the thickness of each of the first splice plate 2A and the second splice plate 2B is increased, a stress applied to the joint is reduced, but an offset of the load increases. Therefore, an improvement in the fatigue strength cannot be expected.

On the other hand, according this embodiment, the fasteners 3, which are aids to assist a fatigue strength improving process, are disposed to be opposed to the first splice plate 2A and the second splice plate 2B which are processing objects on which the improving process is performed, thereby generating sparks between the fasteners 3 and the first and second splice plates 2A, 2B. Therefore, this embodiment is effective for improving the fatigue strength without changing the design.

Though materials having a high fatigue strength can be used to improve the fatigue strength, this method leads to an increase in cost and requires a design change when existing structural elements are used. Also in this regard, according to this embodiment, material costs are not increased and there is no need to change the design.

In the method of applying a compressive residual stress by shot peening, for example, which is known as a method for improving fatigue strength, a large workload is required for shot peening. In addition, when the method is applied after the use of the object, it is necessary to remove a covering member from a portion to which a compressive residual stress is applied if the portion is covered with the covering member. Therefore, if there are many covering members, for example, the method is not practical. Further, at a small portion, such as the circumferential surface 7 of this embodiment, it is difficult to apply shot peening.

In this regard, according to this embodiment, the fatigue strength can be improved only by generating sparks to repair the small crack C by welding. In addition, even at a small portion, such as the circumferential surface 7 of the fastening hole 5, and even when the portion is covered with the fasteners 3, the fatigue strength can be improved only by generating sparks. Therefore, this embodiment can be applied with a small workload required for improving the fatigue strength, without any effort after use.

The present invention has been described above based on preferred embodiments, but can be modified as appropriate by, for example, choosing some of the components described in the above embodiments, without departing from the scope of the invention.

Figure 4A:
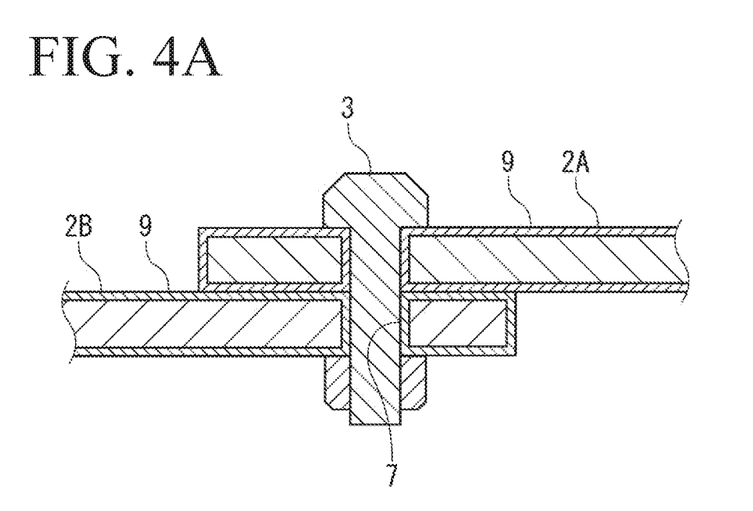
FIGS. 4A and 4B are diagrams each showing another mode for implementing the method for improving fatigue strength according to the present invention.
Figure 4B:
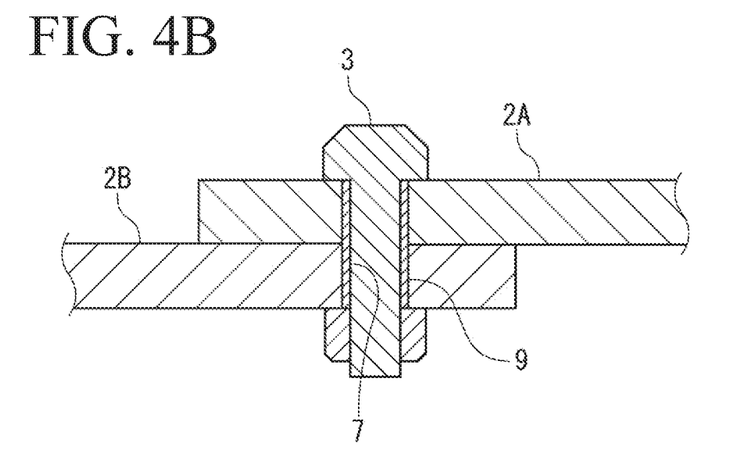

For example, in the present invention, a non-conductive layer can be formed on the surface of a region in which sparks are to be generated. In the above embodiments, for example, coating is applied to the first splice plate 2A and the second splice plate 2B and a non-conductive covering layer 9 is formed on the surfaces thereof as shown in FIG. 4A, thereby facilitating the generation of sparks between the circumferential surface 7 and the fasteners 3. As shown in FIG. 4B, the covering layer 9 may be formed by applying coating only to the fasteners 3. Alternatively, although not shown, the non-conductive covering layer 9 may be formed by applying coating to the fasteners 3 and both the first and second splice plates 2A and 2B.

Figure 2B:
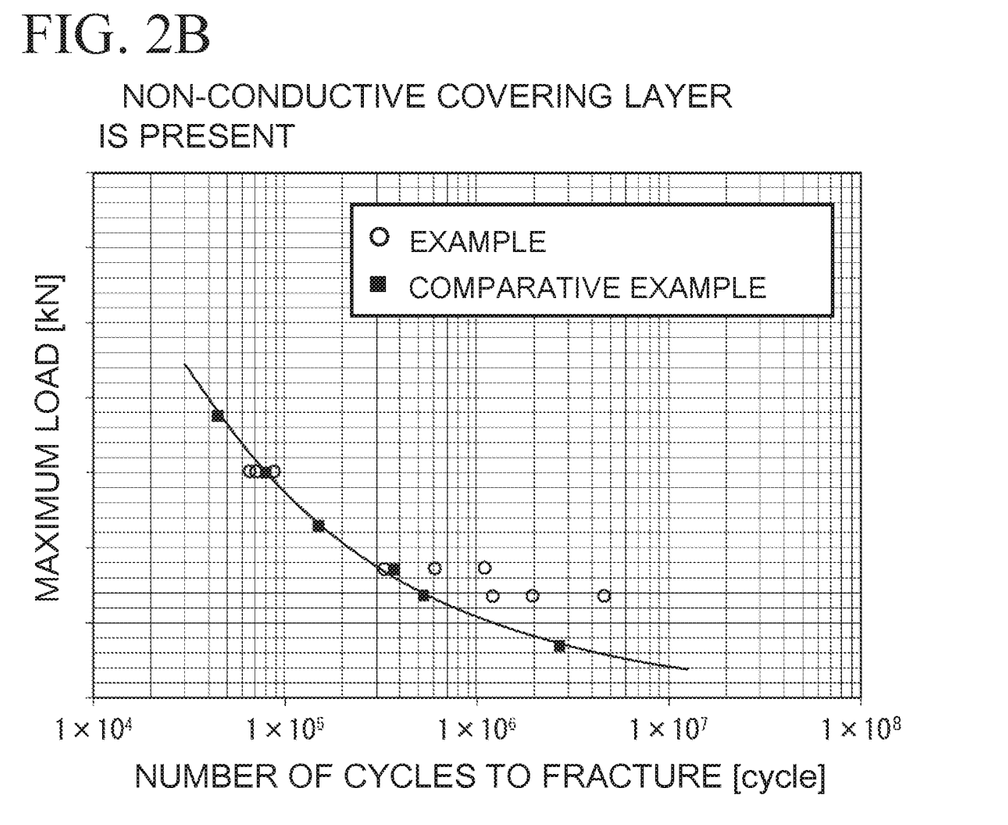
Figure 3:
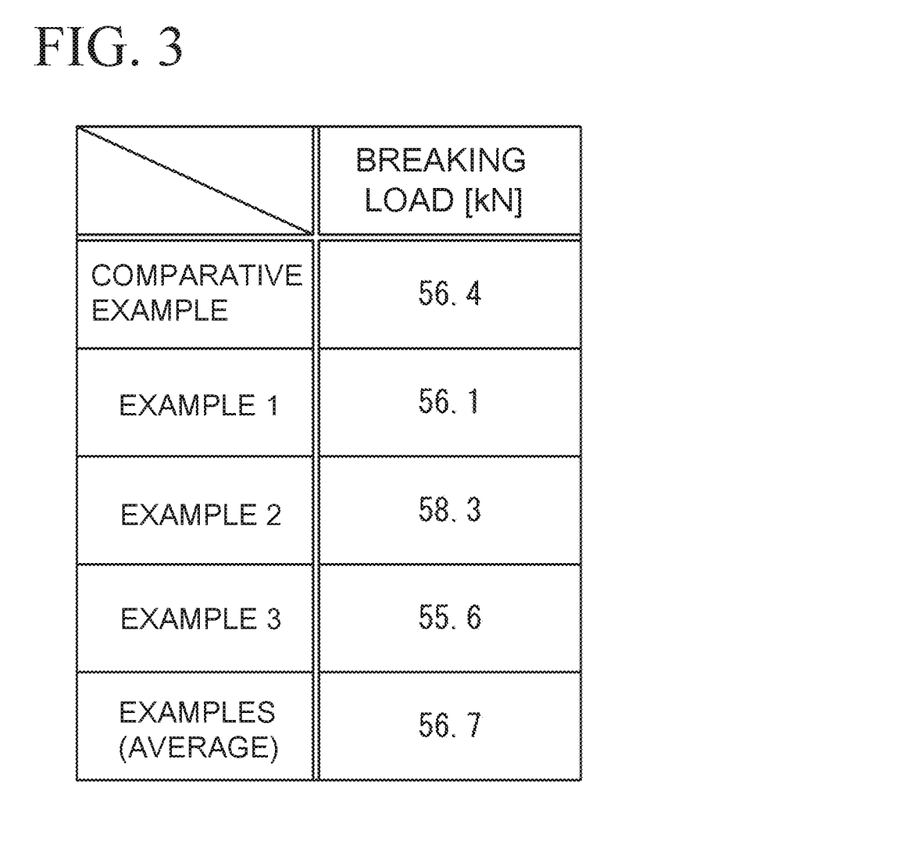
FIG. 3 is a table showing static strength evaluation results according to Example and Comparative Example of the present invention.

FIG. 2B shows the results of measuring the fatigue strength in a similar manner to Example except that coating is applied to the first splice plate 2A and the second splice plate 2B of the above Example as shown in FIG. 4A and a non-conductive layer is formed on the surfaces thereof. As shown in FIG. 2B, it was confirmed that the fatigue strength can be further improved in a region with a small load by forming the non-conductive layer. This seems to be because sparks were more easily generated and repair of the small crack C was promoted.

Figure 5A:
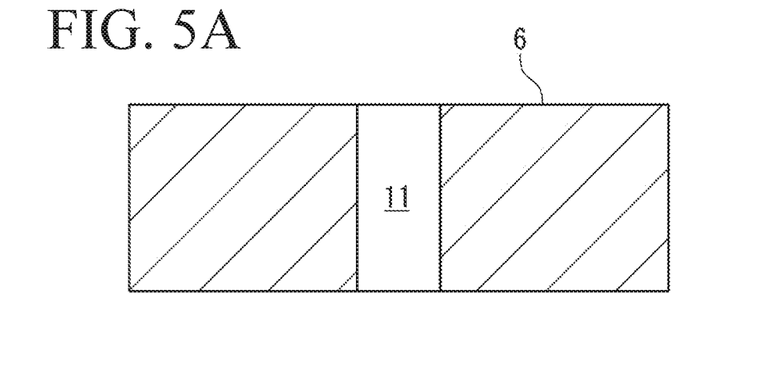
FIGS. 5A to 5C are diagrams each showing still another mode for implementing the method for improving fatigue strength according to the present invention.
Figure 5B:
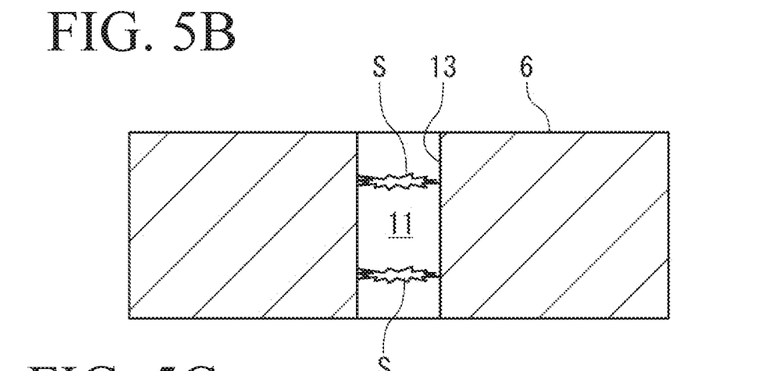
Figure 5C:
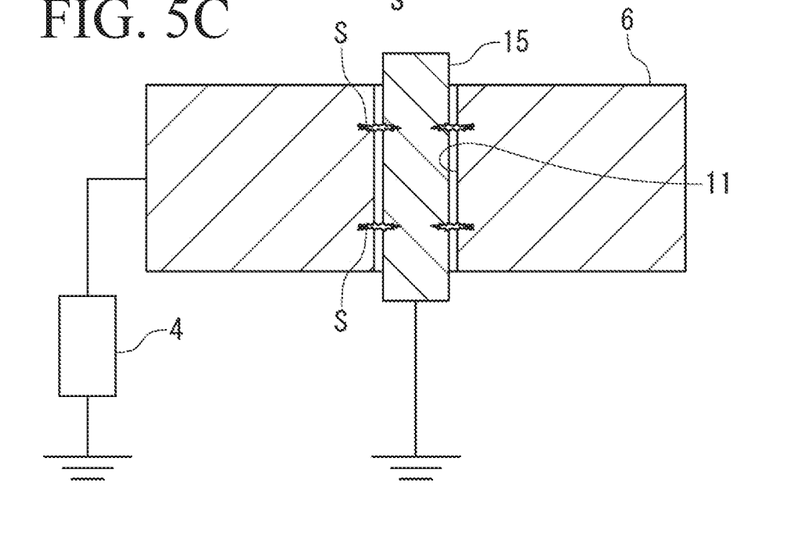

While the above embodiments illustrate, by way of example, the fastener joint 1 to which the fasteners 3 are attached, the object to which the present invention is applied is not limited to this, and any object can be used as long as sparks can be generated. For example, as shown in FIG. 5A, the present invention can be applied to a through-hole 11 which is formed in a processing object 6 and is not provided with members corresponding to the fastener 3. In this mode, when the diameter of the through-hole 11 is small, as shown in FIG. 5B, the sparks S are generated between different portions of a circumferential surface 13, even if other members are not applied. When the diameter of the through-hole 11 is large, as shown in FIG. 5C, an aid 15 which corresponds to each fastener 3 described above and assists the generation of the sparks S may be inserted into the through-hole 11, and then a high current may be applied.

The through-holes including the fastening holes 5 are objects suitable for obtaining the advantageous effects of the present invention. However, the present invention can be applied to any structure.

Figure 6A:
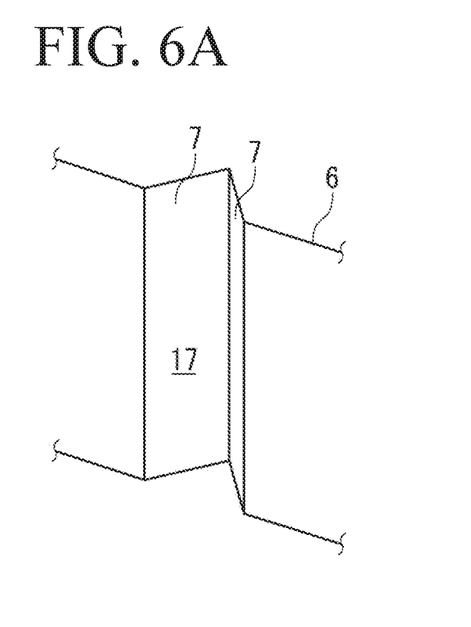
FIGS. 6A to 6C are diagrams each showing still one more mode for implementing the method for improving fatigue strength according to the present invention.
Figure 6B:
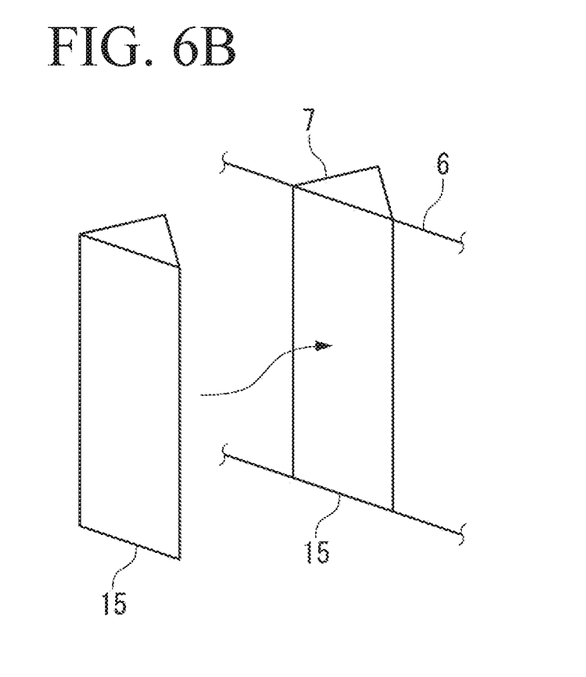

For example, when a notch 17, which is a V-shaped groove, is formed at an end face of the processing object 6 as shown in FIG. 6A, the method for improving fatigue strength according to the present invention can be applied to the notch 17. In this case, as shown in FIG. 6B, the shape of the aid 15 for generating the sparks S between the aid and the processing object 6 is similar to the shape of the notch 17. The aid 15 is opposed to the notch 17, and a high current is applied between the processing object 6 and the aid 15. Accordingly, the sparks are generated between the aid 15 and the circumferential surface 7 that defines the periphery of the notch 17, which is a groove, and the small crack C generated on the circumferential surface 7 is repaired by welding.

Figure 6C:
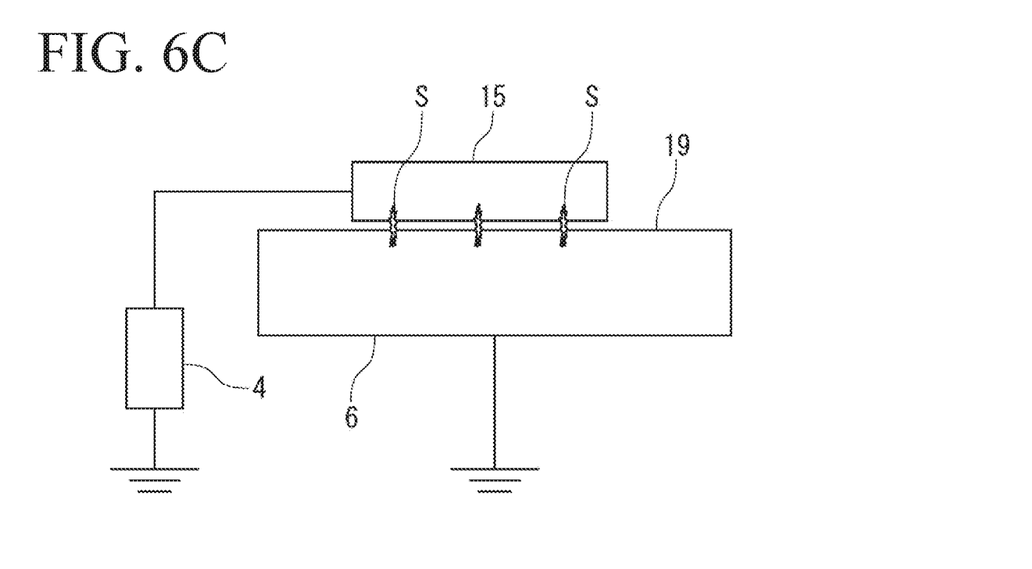

For example, according to the present invention, as shown in FIG. 6C, the aid 15 is opposed to a flat surface 19 of the processing object 6, and a high current is applied between the processing object 6 and the aid 15, thereby making it possible to generate sparks between the aid 15 and the flat surface 19 of the processing object 6.

As described above, according to the present invention, the aid may be attached to the processing object before the improving process for generating the sparks S is performed, or the aid may be opposed to the processing object when the improving process for generating the sparks S is performed.

Furthermore, any current may be applied in the present invention, as long as the process for improving the fatigue strength by generating sparks is generated. Conditions suitable for the object for improving the fatigue strength can be confirmed by a test.

What is claimed is:

1. A method for repairing cracks on an inner peripheral surface of a processing object which comprises first and second splice plates, the method comprising:
    overlapping the first splice plate on the second splice plate, wherein said inner peripheral surface defines a through hole passing through said first and second splice plates;
    fastening said first and second splice plates together by disposing a fastener to the inner peripheral surface; and
    generating sparks between the inner peripheral surface and the fastener, thereby repairing said cracks on the inner peripheral surface.

2. The method according to claim 1, wherein welding due to the generation of the sparks is caused on the inner peripheral surface of the processing object, the inner peripheral surface being opposed to the fastener.

3. The method according to claim 2, wherein the of fastener has a circumferential surface facing the inner peripheral surface of the processing object.

4. The method according to claim 1, wherein the fastener is attached to the processing object before generating the sparks.

5. The method according to claim 1, wherein the fastener is opposed to the processing object when generating the sparks.

6. The method according to claim 1, wherein the processing object is made of a metallic material.

7. The method according to claim 1, wherein the fastener is made of a metallic material.

8. The method according to claim 6,
    wherein the fastener is made of a metallic material, and the processing object includes a non-conductive covering layer which is formed on a surface of the processing object.

9. The method according to claim 1,
wherein the fastener is made of a metallic material, and the processing object includes a non-conductive covering layer which is formed on a surface of the processing object.

10. The method according to claim 7,
wherein the fastener includes a non-conductive covering layer which is formed on a surface of the fastener.

11. The method according to claim 1,
wherein the fastener includes a non-conductive covering layer which is formed on a surface of the fastener.

12. The method according to claim 2, wherein the fastener is attached to the processing object before generating the sparks.

13. The method according to claim 3, wherein the fastener is attached to the processing object before generating the sparks.

14. The method according to claim 2, wherein the fastener is opposed to the processing object when generating the sparks.

15. The method according to claim 3, wherein the fastener is opposed to the processing object when generating the sparks.

* * * * *